(12) United States Patent
Murata et al.

(10) Patent No.: US 11,377,987 B2
(45) Date of Patent: Jul. 5, 2022

(54) POWER UNIT DEVICE OF VEHICLE

(71) Applicant: Mazda Motor Corporation, Hiroshima (JP)

(72) Inventors: Hideki Murata, Aki-gun (JP); Eiji Mito, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/205,264

(22) Filed: Mar. 18, 2021

(65) Prior Publication Data
US 2021/0332726 A1 Oct. 28, 2021

(30) Foreign Application Priority Data

Apr. 23, 2020 (JP) .............................. JP2020-076858

(51) Int. Cl.
| | | |
|---|---|---|
| *F01M 11/00* | (2006.01) | |
| *F16H 57/037* | (2012.01) | |
| *F16H 57/00* | (2012.01) | |

(52) U.S. Cl.
CPC ....... *F01M 11/0004* (2013.01); *F16H 57/037* (2013.01); *F01M 2011/0016* (2013.01); *F01M 2011/0054* (2013.01); *F01M 2011/0058* (2013.01); *F16H 2057/005* (2013.01)

(58) Field of Classification Search
CPC ....... F01M 11/0004; F01M 2011/0016; F01M 2011/0054; F01M 2011/0058; F16H 57/037; F16H 2057/005; F16H 57/0419; F16H 57/0452; F16H 57/0483; B60K 5/02; B60K 17/165; B60K 17/24; B60K 17/344
See application file for complete search history.

(56) References Cited

FOREIGN PATENT DOCUMENTS

| JP | S61105217 A | 5/1986 |
|---|---|---|
| JP | 2018071556 A * | 5/2018 |

* cited by examiner

*Primary Examiner* — Jacob M Amick
*Assistant Examiner* — Charles J Brauch
(74) *Attorney, Agent, or Firm* — Alleman Hall Creasman & Tuttle LLP

(57) ABSTRACT

In a power unit device of a vehicle in which a differential device is arranged on one side of an engine, warming-up of the engine is facilitated while heat convection from an oil pan to a differential housing is inhibited. The power unit device includes a heat insulating member that covers the outer side of an oil pan, and a differential housing that is fitted to and mounted on the oil pan. A fitting portion is provided in the differential housing, and a fitted portion is provided in the oil pan. A fitting face portion of one of the fitting portion and the fitted portion includes, at different positions in the circumferential direction, a plurality of recesses and projections in the radial direction, and is fitted to a fitting face portion of the other of the fitting portion and the fitted portion by the plurality of projections.

18 Claims, 14 Drawing Sheets

POWER UNIT DEVICE OF VEHICLE

TECHNICAL FIELD

The present invention relates to a power unit device of a vehicle.

BACKGROUND ART

A vehicle has been known which is a front-engine/rear-drive (FR) based four-wheel drive (4WD) vehicle in which an engine as a drive source, a transmission, and a transfer device are arranged in a vehicle body front portion such that axes thereof extend in the front-rear direction, in which left and right rear wheels are driven via a rear-wheel propeller shaft extending rearward from the transfer device, and a rear-wheel differential device, and in which left and right front wheels are driven via a front-wheel propeller shaft extending forward from the lateral side of the transfer device, and a front-wheel differential device.

In the vehicle, the vehicle body front portion is equipped with a power unit device provided with the engine, the transmission, and the front-wheel differential device, the front-wheel differential device is arranged on one vehicle-width-direction side of the engine, and a drive shaft extending toward the other vehicle-width-direction side from the front-wheel differential device is sometimes inserted into an oil pan of the engine (see, for example, Patent Literature 1).

CITATION LIST

Patent Literature

Patent Literature 1: Japanese Patent Laid-Open No. 61-105217

SUMMARY OF INVENTION

Problem to be Solved by the Invention

A vehicle provided with an engine is required to facilitate warming-up of the engine when the engine is cold, for the purpose of, for example, enhancing fuel consumption performance and exhaust gas purification performance. In contrast, it is conceivable that warming-up of the engine can be facilitated by providing a cover member having a heat insulating property such that the cover member covers the periphery of the engine from the outer side.

Similarly, in a power unit device of a vehicle in which an engine, a transmission, and a front-wheel differential device are provided, and in which the differential device is arranged on one vehicle-width-direction side of the engine, it is conceivable that warming-up of the engine can be facilitated by providing a cover member such that the cover member covers the peripheries of a cylinder block and an oil pan in the engine from the outer sides.

However, in a case where a drive shaft extending, from a differential device that is arranged on one vehicle-width-direction side of an engine, toward the other vehicle-width-direction side is inserted into an oil pan of the engine, and where a differential housing that houses the differential device is fitted to and mounted on the oil pan, heat from the oil pan to the differential housing is transferred in a fitting section between the differential housing and the oil pan, reducing facilitation of warming-up of the engine.

Thus, the present invention has an object to provide a power unit device of a vehicle which can, in the vehicle in which a differential device is arranged on a first vehicle-width-direction side of an engine, facilitate warming-up of the engine while inhibiting heat convection from an oil pan to a differential housing in a fitting section between the oil pan and the differential housing.

Means for Solving the Problem

The present invention provides a power unit device of a vehicle in which, from a differential device that is arranged on a first vehicle-width-direction side of an engine, a drive shaft is inserted into an oil pan of the engine and extends toward a second vehicle-width-direction side. The power unit device includes a heat insulating member that covers the outer side of the oil pan, and a differential housing that houses the differential device and that is fitted to and mounted on the first vehicle-width-direction side of the oil pan. A fitting portion that is formed in a cylindrical shape is provided in the differential housing, a fitted portion that is formed in a cylindrical shape and to which the fitting portion of the differential housing is fitted is provided in the oil pan, and a fitting face portion of one of the fitting portion of the differential housing and the fitted portion of the oil pan includes, at different positions in the circumferential direction, a plurality of recesses recessed in the radial direction and a plurality of projections protruding in the radial direction, and is fitted to a fitting face portion of the other of the fitting portion of the differential housing and the fitted portion of the oil pan by the plurality of projections.

According to the present invention, the outer side of the oil pan is covered with the heat insulating member, so that warming-up of the engine can be facilitated. Furthermore, the fitting face portion of one of the fitting portion of the differential housing and the fitted portion of the oil pan includes the plurality of recesses recessed in the radial direction and the plurality of projections protruding in the radial direction, and is fitted to the fitting face portion of the other of the fitting portion of the differential housing and the fitted portion of the oil pan by the plurality of projections. Thus, as compared with a case where the recesses are not formed in the fitting face portion of one of the differential housing and the oil pan, a contact area between the fitting portion of the differential housing and the fitted portion of the oil pan is reduced, and heat convection from the oil pan to the differential housing in a fitting section between the oil pan and the differential housing can be inhibited.

Accordingly, in the power unit device of the vehicle in which the differential device is arranged on the first vehicle-width-direction side of the engine, warming-up of the engine can be facilitated while heat convection from the oil pan to the differential housing in the fitting section between the oil pan and the differential housing is inhibited.

Preferably, the heat insulating member is arranged between the oil pan and the differential housing.

With this configuration, even in a case where the differential housing is fitted to and mounted on the first vehicle-width-direction side of the oil pan, in a section excluding the fitting section between the oil pan and the differential housing, the heat insulating member is arranged between the oil pan and the differential housing, so that facilitation of warming-up of the engine can be achieved.

The fitting face portion of the differential housing is formed by an outer peripheral face of the fitting portion of the differential housing, the fitting face portion of the oil pan is formed by an inner peripheral face of the fitted portion of the oil pan, and an outer diameter of the fitting face portion of the differential housing is formed so as to be smaller than an inner diameter of the fitting face portion of the oil pan.

With this configuration, the outer diameter of the fitting face portion that is formed by the outer peripheral face of the fitting portion of the differential housing is formed so as to be smaller than the inner diameter of the fitting face portion that is formed by the inner peripheral face of the fitted portion of the oil pan, so that the fitting portion of the differential housing can be relatively easily fitted and connected to the fitted portion of the oil pan.

Preferably, the differential housing is formed by mating, in the vehicle body front-rear direction, a front-side housing and a rear-side housing, and is formed such that a mating face between the front-side housing and the rear-side housing is located at the recess that is provided in the fitting face portion of the differential housing.

With this configuration, the differential housing is formed such that the mating face between the front-side housing and the rear-side housing is located at the recess that is provided in the fitting face portion of the differential housing, so that, in a case where an outer peripheral face of the projection is processed by machining in a state where the front-side housing and the rear-side housing are mated, the projection can be processed with high accuracy as compared with a case where a mating face between the front-side housing and the rear-side housing is formed in the projection.

Preferably, the differential housing includes a differential housing-side mounting portion that is mounted on the oil pan by using a fastening member, the oil pan includes an oil pan-side mounting portion on which the differential housing is mounted by using the fastening member, and the heat insulating member is arranged between the differential housing-side mounting portion and the oil pan-side mounting portion.

With this configuration, the heat insulating member is arranged between the differential housing-side mounting portion and the oil pan-side mounting portion which are mounted by using the fastening member, so that heat convection from the oil pan to the differential housing can be inhibited in a mounting section between the oil pan and the differential housing, and warming-up of the engine can be facilitated.

Preferably, the plurality of projections of the fitting face portion are arranged at different positions at equal intervals in the circumferential direction, and the plurality of recesses are formed at different positions in the circumferential direction and between the projections adjacent to each other in the circumferential direction.

Preferably, the plurality of projections are formed so as to be identical in shape with each other, and the plurality of recesses are formed so as to be identical in shape with each other.

Advantageous Effect of Invention

The power unit device of the vehicle according to the present invention can facilitate warming-up of the engine while inhibiting heat convection from the oil pan to the differential housing in the fitting section between the oil pan and the differential housing.

MODE FOR CARRYING OUT THE INVENTION

Hereinafter, an embodiment of the present invention will be explained with reference to the attached drawings.

Figure 1:
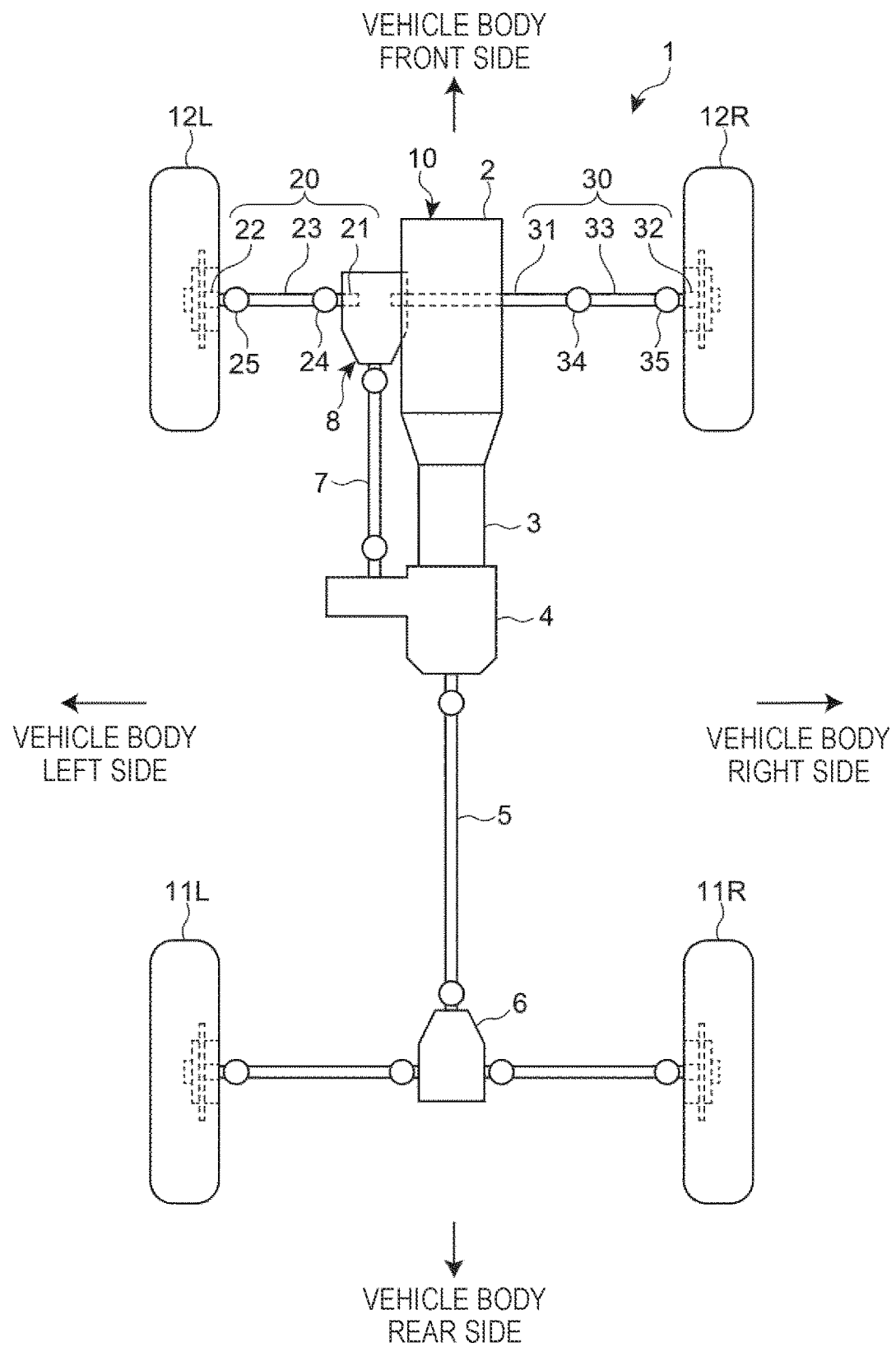
FIG. 1 is a schematic configuration view of a vehicle equipped with a power unit device according to an embodiment of the present invention.

FIG. 1 is a schematic configuration view of a vehicle equipped with a power unit device according to the embodiment of the present invention. As illustrated in FIG. 1, a vehicle 1 equipped with the power unit device according to the embodiment of the present invention is a four-wheel drive (4WD) vehicle of a longitudinal engine type based on a front-engine/rear-drive (FR) vehicle. In the vehicle 1, an engine 2 as a drive source is arranged in a vehicle body front portion, a transmission 3 is arranged on the vehicle body rear side of the engine 2, and a transfer device 4 is arranged on the vehicle body rear side of the transmission 3. The engine 2, the transmission 3, and the transfer device 4 are arranged such that axes thereof extend in the vehicle body front-rear direction.

The transfer device 4 transfers motive power from the engine 2 which is transferred from the transmission 3, to left and right rear wheels 11L and 11R via a rear-wheel propeller shaft 5 extending rearward and a rear-wheel differential device 6, and to left and right front wheels 12L and 12R via a front-wheel propeller shaft 7 extending forward and a front-wheel differential device 8.

The vehicle body front portion is equipped with a power unit device 10 provided with the engine 2, the transmission 3, and the front-wheel differential device 8, and the differential device 8 is arranged on the vehicle body left side of the engine 2. A drive shaft 20 extending toward the vehicle body left side, which is one vehicle-width-direction side, is connected to the differential device 8, and a drive shaft 30 extending toward the vehicle body right side, which is the other vehicle-width-direction side, is connected to the differential device 8.

The drive shaft 20 includes a differential-side shaft 21 that is connected to the differential device 8, a wheel-side shaft 22 that is connected to the front wheel 12L, and an intermediate shaft 23 that is connected to the differential-side shaft 21 and the wheel-side shaft 22 via a differential-side universal joint 24 and a wheel-side universal joint 25.

The drive shaft 30 includes a differential-side shaft 31 that is connected to the differential device 8, a wheel-side shaft 32 that is connected to the front wheel 12R, and an intermediate shaft 33 that is connected to the differential-side shaft 31 and the wheel-side shaft 32 via a differential-side universal joint 34 and a wheel-side universal joint 35.

In the vehicle 1, for the purpose of, for example, lowering the vehicle height, the drive shaft 30 extending toward the vehicle body right side from the differential device 8 that is arranged on the vehicle body left side of the engine 2 is inserted into a through hole provided in an oil pan of the engine 2, extends toward the vehicle body right side, and is connected to the front wheel 12R.

Next, the power unit device of the vehicle according to the present embodiment will be explained with reference to FIGS. 2 to 13.

Figure 2:
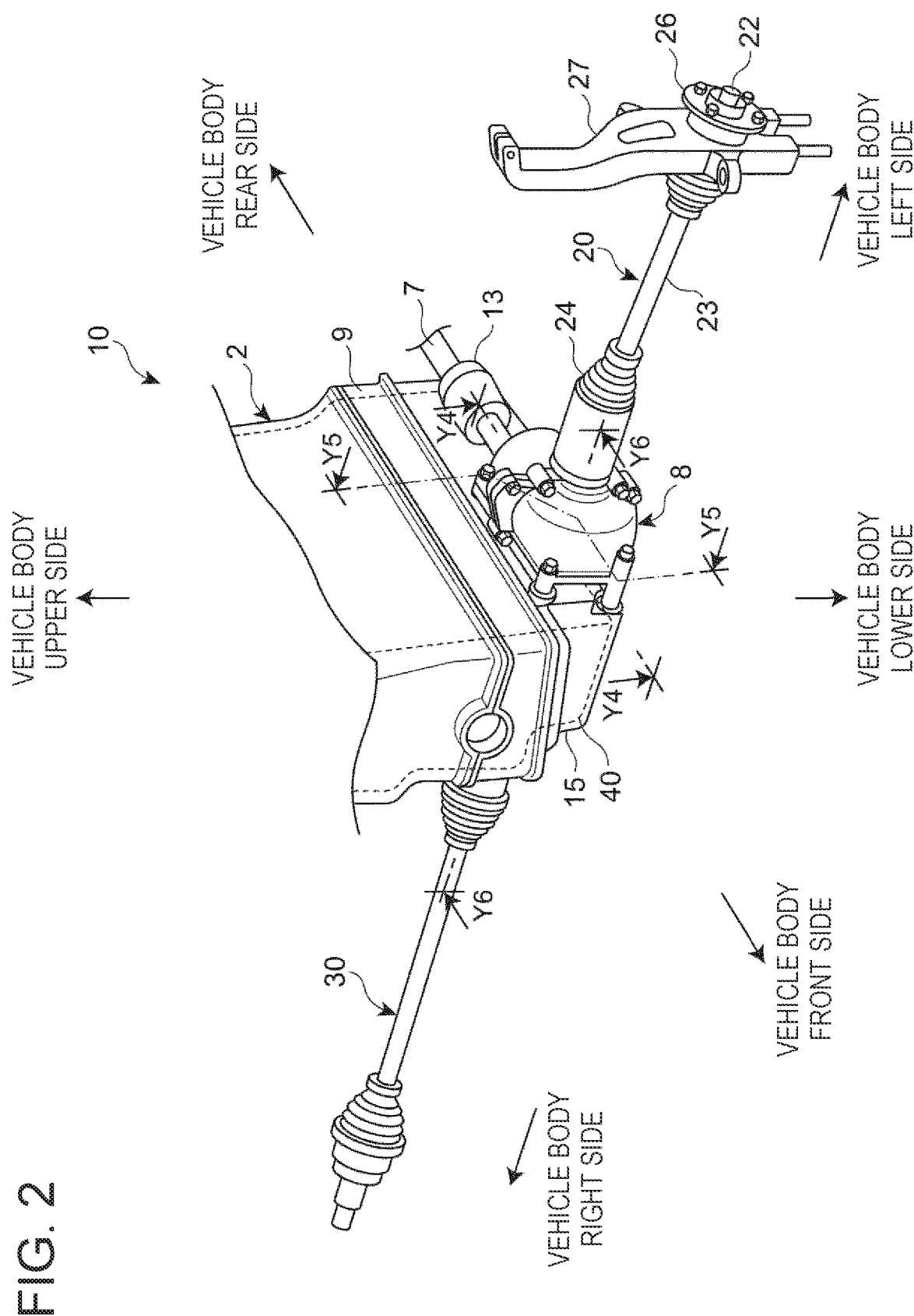
FIG. 2 is a perspective view illustrating the power unit device.
Figure 3:
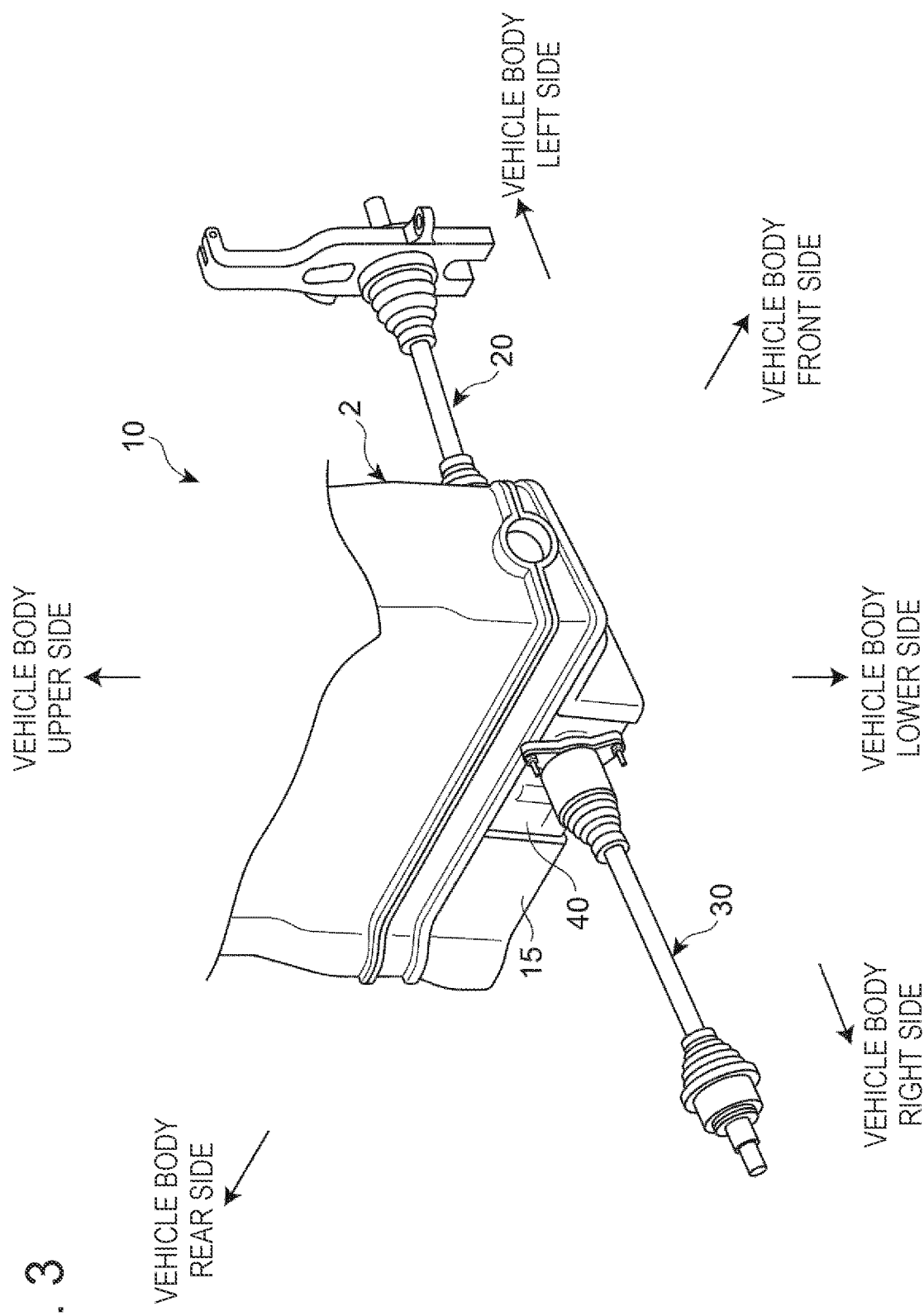
FIG. 3 is another perspective view illustrating the power unit device.
Figure 4:
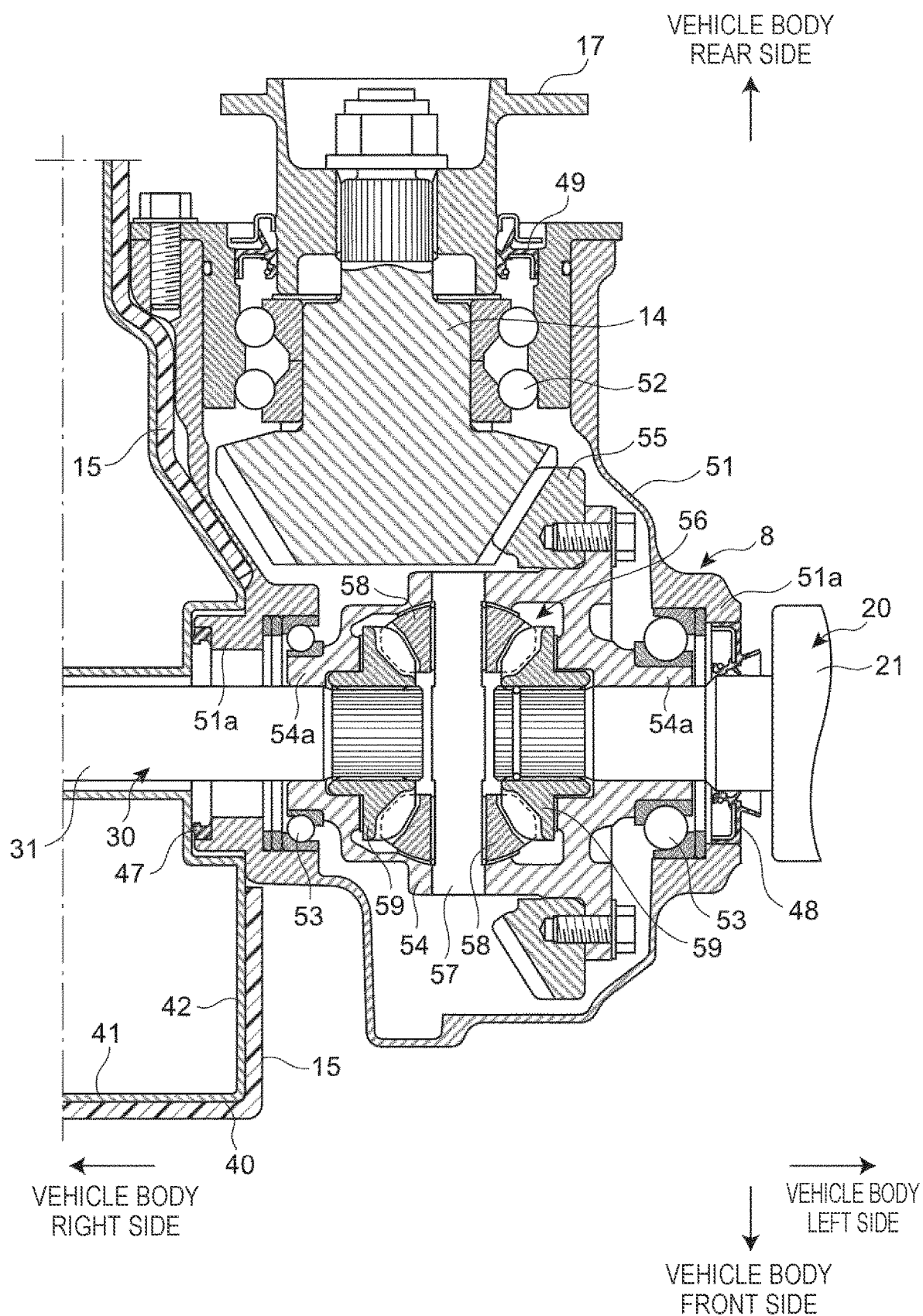
FIG. 4 is a cross-sectional view of the power unit device, which is taken along line Y4-Y4 of FIG. 2.
Figure 5:
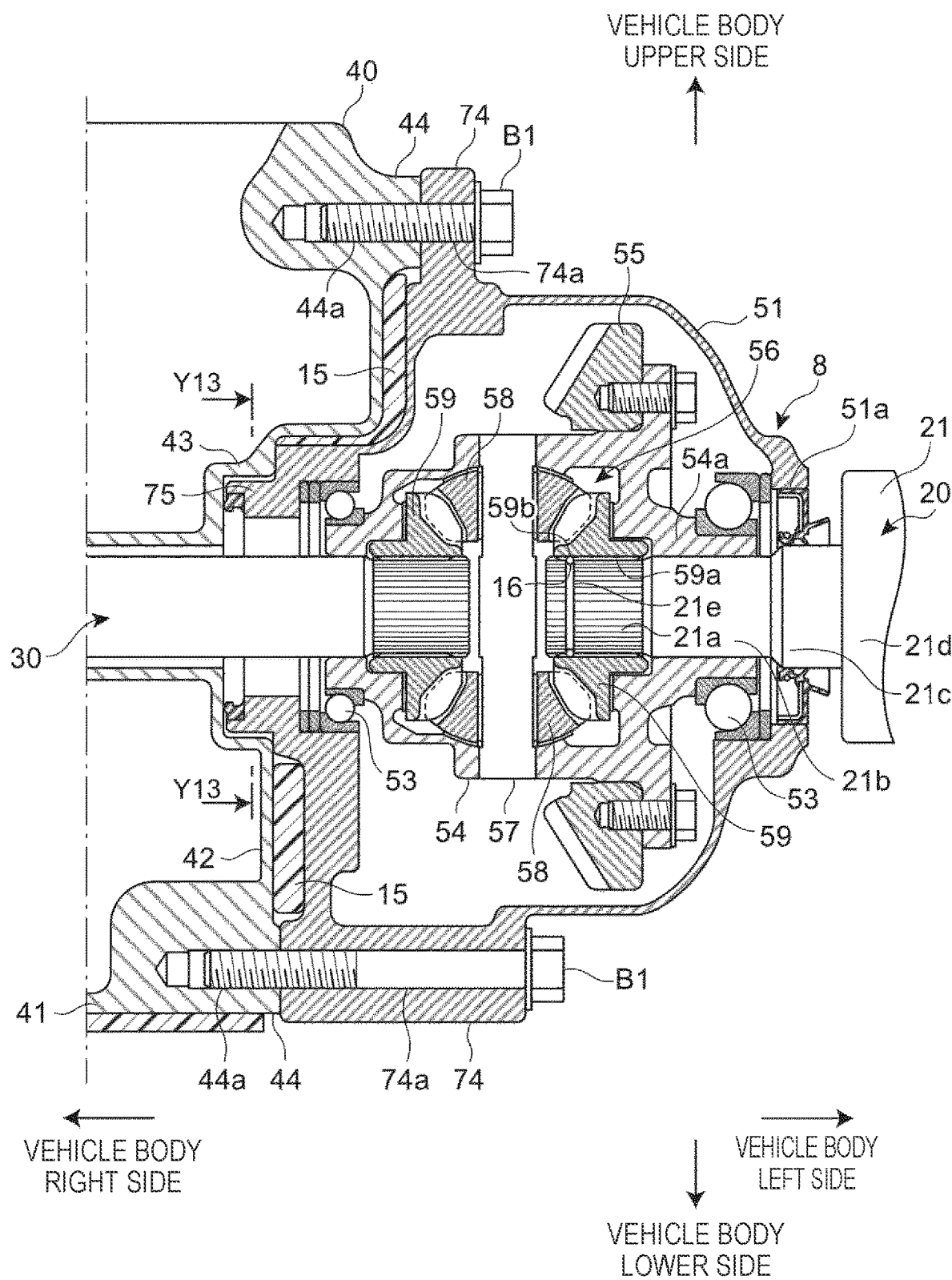
FIG. 5 is a cross-sectional view of the power unit device, which is taken along line Y5-Y5 of FIG. 2.
Figure 6:
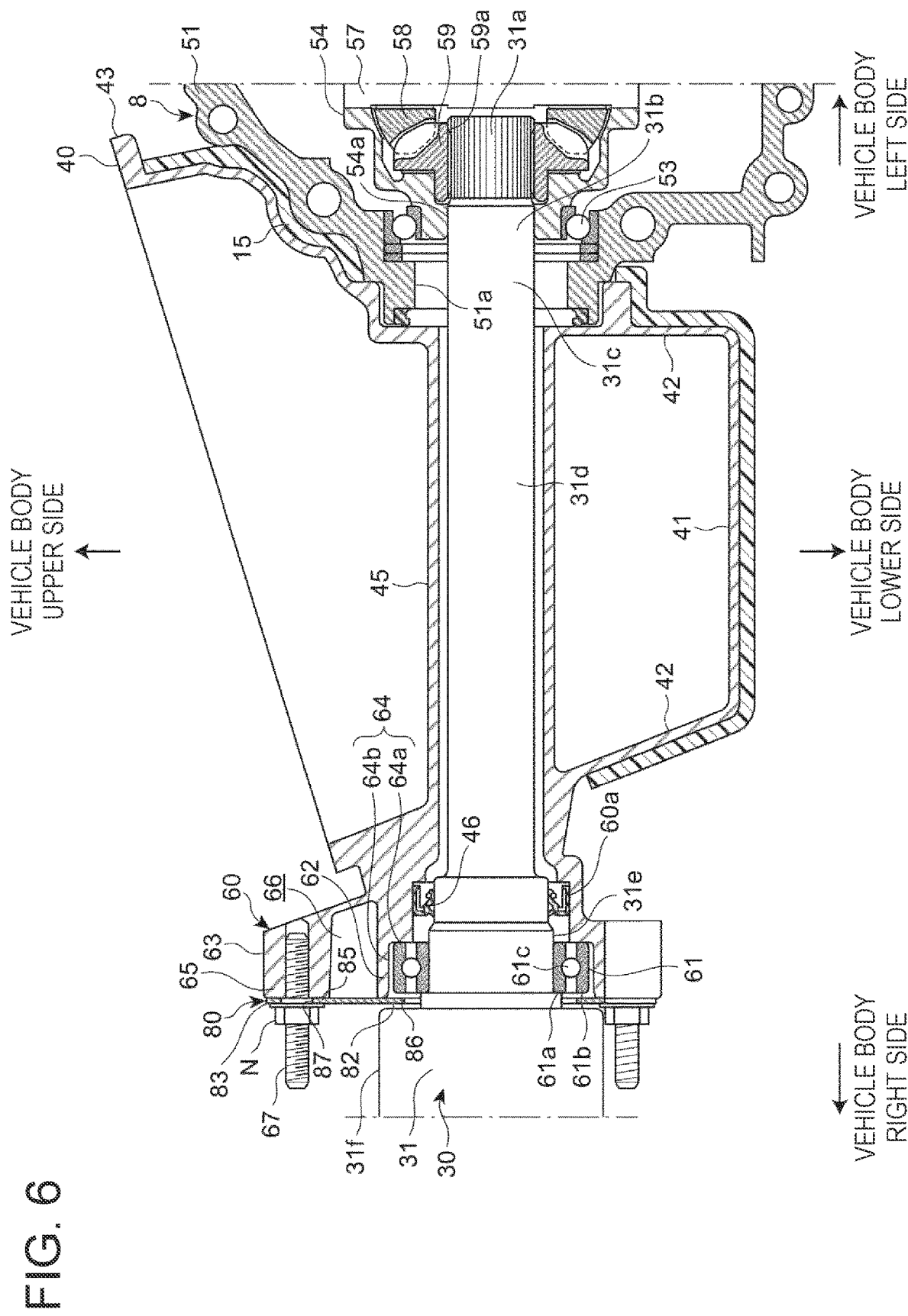
FIG. 6 is a cross-sectional view of the power unit device, which is taken along line Y6-Y6 of FIG. 2.

FIG. 2 is a perspective view illustrating the power unit device, and FIG. 3 is another perspective view illustrating the power unit device. FIGS. 4, 5, and 6 are cross-sectional views of the power unit device, which are taken along line Y4-Y4, line Y5-Y5, and line Y6-Y6 of FIG. 2, respectively.

As illustrated in FIGS. 2 to 6, the power unit device 10 includes the engine 2 and the differential device 8 that is arranged on the vehicle body left side of the engine 2, and the drive shafts 20 and 30 are connected to the vehicle body left side and vehicle body right side of the differential device 8, respectively.

In the vehicle 1, a heat insulating member 15 as a cover member is mounted so as to cover the peripheries of a cylinder block 9 and an oil pan 40 in the engine 2 from the respective outer sides. The heat insulating member 15 is formed by using a resin material such as a urethane foam resin material and arranged so as to cover at least a part of the outer side of the oil pan 40. Thus, the heat insulating member 15 is provided, so that warming-up of the engine 2 can be facilitated.

As illustrated in FIG. 4, the power unit device 10 includes a differential housing 51 that houses the differential device 8. The differential housing 51 is fitted to the vehicle body left side of the oil pan 40 and mounted on the oil pan 40. The heat insulating member 15 is also arranged between the oil pan 40 and the differential housing 51.

In the differential housing 51, a drive pinion 14 is also housed on the vehicle body rear side of the differential device 8. The drive pinion 14 is rotatably supported on the differential housing 51 via a bearing 52, connected to the front-wheel propeller shaft 7 via a universal joint 13, and receives the motive power from the engine 2.

The differential device 8 has a differential case 54 rotatably supported on the differential housing 51 via a bearing 53, and a ring gear 55 that is fixed to the differential case 54. The ring gear 55 meshes with the drive pinion 14 and is arranged on the vehicle body left side of the drive pinion 14.

The differential device 8 has a differential mechanism 56. The differential mechanism 56 has a pinion shaft 57 that is fixed to the differential case 54 and that extends in the direction orthogonal to the vehicle width direction, a pair of pinion gears 58 that is freely rotatably fitted to the pinion shaft 57 and that faces each other, and a pair of left and right side gears 59 that meshes with the pair of pinion gears 58.

The drive shafts 20 and 30 that are inserted into shaft insertion portions 51a and 54a provided in the differential housing 51 and the differential case 54 are spline-fitted to the pair of respective side gears 59. The drive shafts 20 and 30 are relatively rotatable with respect to the differential housing 51 and the differential case 54, together with the side gears 59.

As described above, the drive shaft 20 on the vehicle body left side includes the differential-side shaft 21, the wheel-side shaft 22, and the intermediate shaft 23 which are connected via the differential-side universal joint 24 and the wheel-side universal joint 25, and the differential-side shaft 21 is connected to the differential device 8.

As illustrated in FIG. 5, the differential-side shaft 21 includes a spline portion 21a that is spline-fitted to a spline portion 59a formed in an inner peripheral face of the side gear 59, a case insertion portion 21b that is inserted into the shaft insertion portion 54a of the differential case 54, a housing insertion portion 21c that is inserted into the shaft insertion portion 51a of the differential housing 51, and an enlarged diameter portion 21d enlarged in diameter toward the radial-direction outer side relative to the housing insertion portion 21c.

The spline portion 21a of the differential-side shaft 21 is provided in an outer peripheral face on the tip side of the differential-side shaft 21, and the case insertion portion 21b, the housing insertion portion 21c, and the enlarged diameter portion 21d are provided so as to be enlarged in diameter toward the radial-direction outer side in the order from the spline portion 21a to the vehicle body left side. The spline portion 21a of the differential-side shaft 21 and the spline portion 59a of the side gear 59 have a tooth trace extending in the vehicle width direction and are spline-fitted to each other.

As illustrated in FIG. 5, in the spline portion 21a of the differential-side shaft 21, a peripheral groove 21e is formed which is recessed toward the radial-direction inner side along the outer peripheral face of the differential-side shaft 21. In the spline portion 59a of the side gear 59, a peripheral groove 59b is formed which is recessed toward the radial-direction outer side along the inner peripheral face of the side gear 59.

The side gear 59 and the differential-side shaft 21 are spline-fitted to each other such that the peripheral groove 59b and the peripheral groove 21e are positioned so as to overlap with each other in the vehicle width direction, and a clip 16 is attached across the peripheral groove 59b and the peripheral groove 21e.

A C-shaped clip is used for the clip 16, and the clip 16 is attached across the peripheral groove 59b and the peripheral groove 21e and formed so as to be capable of bending toward the inner peripheral side of the spline portion 59a of the side gear 59. The peripheral groove 21e of the differential-side shaft 21 is formed so as to be capable of accommodating the clip 16 reduced in diameter toward the inner peripheral side of the spline portion 59a of the side gear 59.

The clip 16 is, in a state of being attached to the peripheral groove 21e of the differential-side shaft 21, when the drive shaft 20 is inserted into the side gear 59, reduced in diameter toward the inner peripheral side of the spline portion 59a of the side gear 59, and the clip 16 is enlarged in diameter at the position at which the peripheral groove 21e and the peripheral groove 59b overlap with each other in the vehicle width direction and is attached across the peripheral groove 59b and the peripheral groove 21e.

Thus, when the drive shaft 20 is moved toward the vehicle-width-direction inner side, the clip 16 engages with the spline portion 59a of the side gear 59 which forms an end face on the vehicle-width-direction inner side of the peripheral groove 59b, and the moving toward the vehicle-widthdirection inner side is regulated, inhibiting the drive shaft 20 from contacting the pinion shaft 57.

On the other hand, when the drive shaft 20 is moved toward the vehicle-width-direction outer side, the clip 16 engages with the spline portion 59*a* of the side gear 59 which forms an end face on the vehicle-width-direction outer side of the peripheral groove 59*b*, and the moving toward the vehicle-width-direction outer side is regulated, inhibiting the drive shaft 20 from slipping off toward the vehicle-width-direction outer side.

As illustrated in FIG. 2, during vehicle body assembly, the drive shaft 20 is, in a state where a wheel support 26 supporting the front wheel 12L and a knuckle 27 on which a suspension device (not illustrated) is mounted are mounted on the wheel-side shaft 22, inserted into the differential housing 51 and connected to the differential device 8.

The drive shaft 20 is short in the differential-side shaft 21 as compared with the drive shaft 30 and is, in a state where the clip 16 is attached to the differential-side shaft 21 and then reduced in diameter, inserted into the side gear 59 and spline-fitted thereto, and the clip 16 is, when reaching the peripheral groove 59*b* of the side gear 59, enlarged in diameter, exhibiting a retaining function.

As described above, the drive shaft 30 on the vehicle body right side includes the differential-side shaft 31, the wheel-side shaft 32, and the intermediate shaft 33 which are connected via the differential-side universal joint 34 and the wheel-side universal joint 35, and the differential-side shaft 31 is connected to the differential device 8.

As illustrated in FIG. 6, the differential-side shaft 31 of the drive shaft 30 includes a spline portion 31*a* that is spline-fitted to the spline portion 59*a* formed in an inner peripheral face of the side gear 59, a case insertion portion 31*b* that is inserted into the shaft insertion portion 54*a* of the differential case 54, a housing insertion portion 31*c* that is inserted into the shaft insertion portion 51*a* of the differential housing 51, and an oil pan insertion portion 31*d* that is inserted into the oil pan 40.

The spline portion 31*a* of the differential-side shaft 31 is provided in an outer peripheral face on the tip side of the differential-side shaft 31, and the case insertion portion 31*b*, the housing insertion portion 31*c*, and the oil pan insertion portion 31*d* are provided in the order from the spline portion 31*a* to the vehicle body right side. The spline portion 31*a* of the differential-side shaft 31 and the spline portion 59*a* of the side gear 59 have a tooth trace extending in the vehicle width direction and are spline-fitted to each other.

The oil pan 40 into which the differential-side shaft 31 is inserted internally stores lubricating oil that is supplied to each unit of the engine 2, and includes a bottom face portion 41 that is formed in a substantially rectangular shape, and a side face portion 42 extending toward the vehicle body upper side from a peripheral edge portion of the bottom face portion 41. In the oil pan 40, an upper end portion of the side face portion 42 is mounted on the cylinder block 9.

The differential housing 51 is mounted on the side face portion 42 on the vehicle body left side of the oil pan 40, and the drive shaft 30 on the vehicle body right side which is connected to the differential device 8 housed in the differential housing 51 is inserted into the oil pan 40 from the vehicle body right side and supported on the vehicle body right side of the oil pan 40.

In the oil pan 40, a through hole 45 into which the drive shaft 30 is inserted is formed in a cylindrical shape, and the through hole 45 extends in the vehicle width direction across the side face portion 42 on the vehicle-width-direction either side. The side face portion 42 on the vehicle body right side of the oil pan 40 is provided with a shaft support portion 60 protruding toward the vehicle body right side and supporting the drive shaft 30.

The differential-side shaft 31 includes a first enlarged diameter portion 31*e* enlarged in diameter relative to the oil pan insertion portion 31*d*, on the vehicle body right side relative to the oil pan insertion portion 31*d*, and includes a second enlarged diameter portion 31*f* enlarged in diameter relative to the first enlarged diameter portion 31*e*, on the vehicle body right side relative to the first enlarged diameter portion 31*e*. In the differential-side shaft 31, a bearing 61 is press-fitted to the first enlarged diameter portion 31*e*, and a retaining member 80 that prevents the drive shaft 30 from slipping off toward the vehicle body right side is fitted to the differential-side shaft 31, on the vehicle body right side relative to the bearing 61 press-fitted to the first enlarged diameter portion 31*e* and on the vehicle body left side relative to the second enlarged diameter portion 31*f*.

The differential-side shaft 31 is inserted into the oil pan 40, and the retaining member 80 is mounted on the shaft support portion 60 of the oil pan 40, so that the drive shaft 30 is mounted and supported on the oil pan 40.

Figure 7:
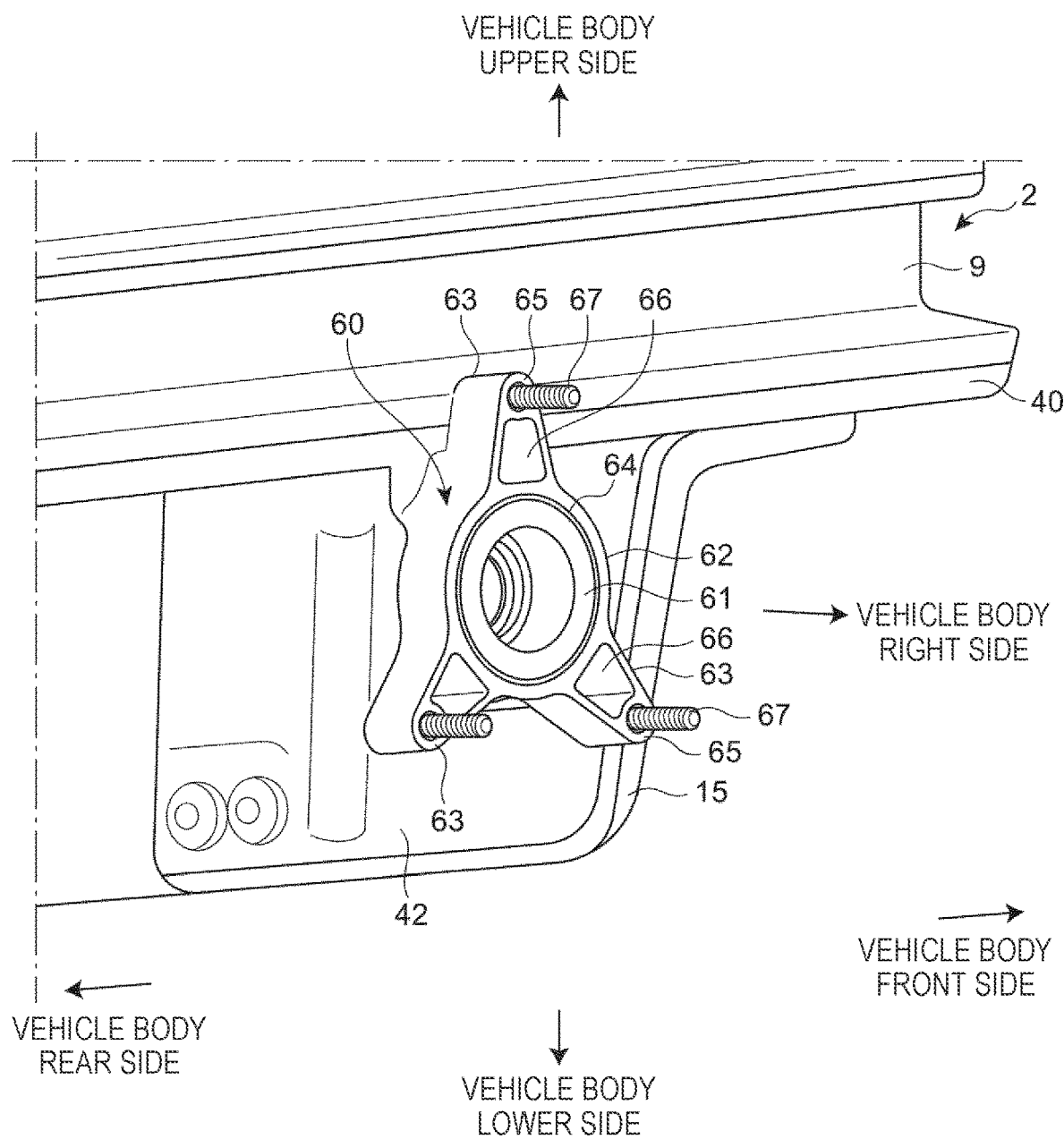
FIG. 7 is a perspective view illustrating a shaft support portion of an oil pan.
Figure 8:
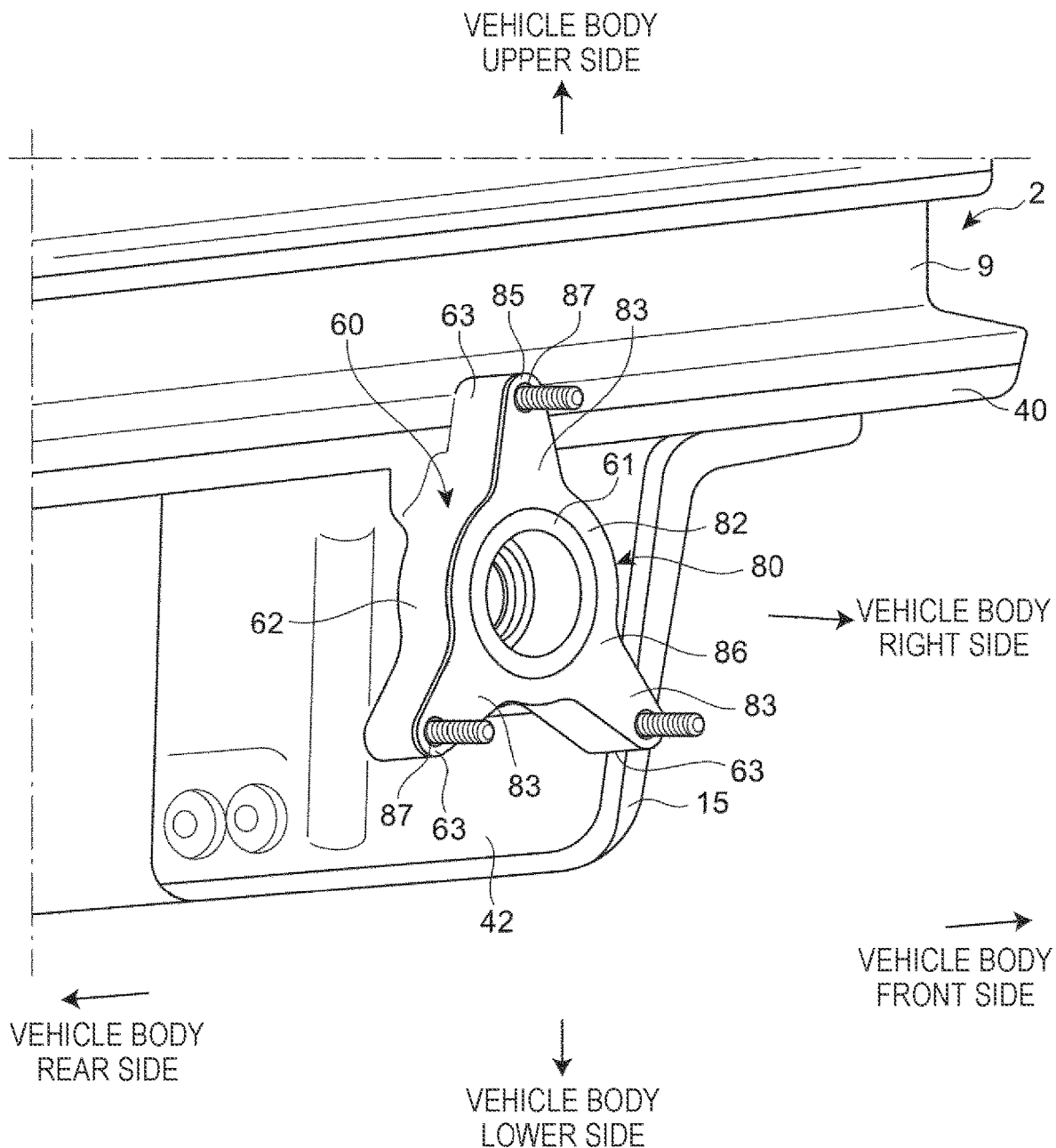
FIG. 8 is a perspective view illustrating a retaining member mounted on the shaft support portion of the oil pan.

FIG. 7 is a perspective view illustrating the shaft support portion of the oil pan, and FIG. 8 is a perspective view illustrating the retaining member mounted on the shaft support portion of the oil pan. FIGS. 7 and 8 also illustrate the bearing that is press-fitted to the drive shaft.

As illustrated in FIG. 7, the shaft support portion 60 of the oil pan 40 has an end face on the vehicle body right side extending in the direction substantially orthogonal to the vehicle width direction and includes a circular portion 62 that is formed in a circular shape as viewed from the vehicle body right side and protrusions 63 protruding in a substantially triangular shape from the circular portion 62 toward the radial-direction outer side. The shaft support portion 60 includes three protrusions 63 protruding toward the vehicle body upper side, the vehicle body front lower side, and the vehicle body rear lower side.

The circular portion 62 of the shaft support portion 60 is formed in an annular shape and, as illustrated in FIG. 6, has an outer diameter that is formed so as to be substantially equal to the second enlarged diameter portion 31*f* of the differential-side shaft 31, and an inner diameter that is formed so as to be smaller than the second enlarged diameter portion 31*f* In the circular portion 62, an inner peripheral face thereof is provided with a shaft insertion portion 60*a* into which the drive shaft 30 is inserted, and a fitting recess 64 to which the bearing 61 press-fitted to the drive shaft 30 is fitted is formed on the vehicle body right side of the shaft insertion portion 60*a*. The fitting recess 64 is formed so as to be recessed in a columnar shape from the vehicle body right side toward the vehicle body left side and includes a bottom face portion 64*a* extending in the direction orthogonal to the vehicle width direction and a side face portion 64*b* that is formed in a cylindrical shape.

The bearing 61 includes an inner wheel 61*a* that is press-fitted to the first enlarged diameter portion 31*e* of the differential-side shaft 31, an outer wheel 61*b* that is fitted so as to be spaced apart from the fitting recess 64 of the shaft support portion 60 in the radial direction, and a plurality of balls 61*c* interposed between the inner wheel 61*a* and the outer wheel 61*b*, and the inner wheel 61*a* and the outer wheel 61*b* are configured relatively rotatably. The bearing 61 is configured as a bearing with a seal which encloses grease or lubricating oil.

In the shaft support portion 60, the side face portion 64*b* of the fitting recess 64 is formed so as to have a larger outer diameter than the outer wheel 61b of the bearing 61. The side face portion 64b of the fitting recess 64 is also formed so as to have a larger vehicle-width-direction length than the bearing 61, and when the bearing 61 press-fitted to the drive shaft 30 abuts against the bottom face portion 64a of the fitting recess 64, the retaining member 80 fitted to the drive shaft 30 is brought into contact with the end face on the vehicle body right side of the shaft support portion 60 and can be mounted thereon.

In the shaft support portion 60, the bottom face portion 64a of the fitting recess 64 is opened on the center side by the shaft insertion portion 60a and formed so as to be capable of engaging only with the outer wheel 61b of the bearing 61 without contacting the inner wheel 61a of the bearing 61. The drive shaft 30 that is inserted into the shaft support portion 60 is relatively rotatable with respect to the oil pan 40, together with the side gear 59.

In the oil pan 40, a sealing member 46 sealing a space with respect to the drive shaft 30 is fixed to and mounted on the shaft insertion portion 60a, on the vehicle body left side relative to the bearing 61. Thus, lubricating oil stored in the differential housing 51 can be inhibited from leaking to the outside from the space between the oil pan 40 and the drive shaft 30, on the vehicle body right side of the oil pan 40.

On the other hand, on the vehicle body left side of the oil pan 40, as illustrated in FIG. 4, a sealing member 47 sealing a space between the oil pan 40 and the differential housing 51 is fixed to the differential housing 51. In addition, a sealing member 48 sealing a space with respect to the drive shaft 20 is fixed to the differential housing 51, and a sealing member 49 sealing a space with respect to a connecting member 17 that is spline-fitted to the drive pinion 14 and that is connected to the universal joint 13 is fixed to the differential housing 51. Thus, the lubricating oil stored in the differential housing 51 is inhibited from leaking to the outside, on the vehicle body right side of the oil pan 40.

Each protrusion 63 of the shaft support portion 60 is formed so as to protrude from the circular portion 62 toward the radial-direction outer side relative to the second enlarged diameter portion 31f of the drive shaft 30. As illustrated in FIG. 7, each protrusion 63 is provide with, on the protrusion tip side, a mounting portion 65 on which the retaining member 80 is mounted, and is provided with, on the protrusion base side, a hole portion 66 recessed toward the vehicle body left side in a substantially trapezoidal shape. In the mounting portion 65 of the protrusion 63, a stud bolt 67 extending toward the vehicle body right side is provided in a protruding manner.

As illustrated in FIG. 6, the retaining member 80 is formed in a flat shape and fitted to the drive shaft 30, specifically, the differential-side shaft 31, such that the retaining member 80 extends in the direction orthogonal to the vehicle width direction, on the vehicle body left side relative to the second enlarged diameter portion 31f and on the vehicle body right side relative to the bearing 61. As illustrated in FIG. 8, the retaining member 80 includes a circular portion 82 that is formed in a circular shape as viewed from the vehicle width direction, and protrusions 83 protruding in a substantially triangular shape from the circular portion 82 toward the radial-direction outer side. The retaining member 80 includes three protrusions 83 protruding toward the vehicle body upper side, the vehicle body front lower side, and the vehicle body rear lower side.

The circular portion 82 of the retaining member 80 is formed in an annular shape and has an outer diameter that is formed so as to be substantially equal to the second enlarged diameter portion 31f of the differential-side shaft 31, and an inner diameter that is formed so as to be smaller than the second enlarged diameter portion 31f. The circular portion 62 and protrusions 63 of the shaft support portion 60 are respectively formed to have, as viewed from the vehicle width direction, substantially identical shapes to those of the circular portion 82 and protrusions 83 of the retaining member 80 in a corresponding manner.

As illustrated in FIG. 6, the retaining member 80 is provided with a mounting portion 85 that is mounted on the shaft support portion 60, and a regulating portion 86 that engages with the vehicle body right side of the bearing 61 press-fitted to the drive shaft 30 and that regulates movement of the drive shaft 30 toward the vehicle body right side.

The mounting portion 85 of the retaining member 80 is provided in each protrusion 83 of the retaining member 80. Each protrusion 83 is formed so as to protrude from the circular portion 82 toward the radial-direction outer side relative to the second enlarged diameter portion 31f of the drive shaft 30. The mounting portion 85 is provided on the protrusion tip side of each protrusion 83, and a bolt insertion hole 87 is formed in the mounting portion 85.

In a state where the stud bolt 67 provided in the shaft support portion 60 in a protruding manner is inserted into the bolt insertion hole 87, a nut N is screwed to the stud bolt 67, so that the mounting portion 85 of the retaining member 80 is mounted on the mounting portion 65 of the shaft support portion 60, and the retaining member 80 is mounted on the shaft support portion 60.

The regulating portion 86 of the retaining member 80 is provided in the circular portion 82 of the retaining member 80. The circular portion 82 has an inner diameter that is formed so as to be larger than the inner wheel 61a of the bearing 61 and smaller than the outer wheel 61b of the bearing 61, and is formed so as to be capable of engaging only with the outer wheel 61b of the bearing 61 without engaging with the inner wheel 61a of the bearing 61 in the vehicle width direction. The circular portion 82 also has an outer diameter that is formed so as to be substantially equal to the second enlarged diameter portion 31f of the differential-side shaft 31, and is formed so as to be capable of engaging with the second enlarged diameter portion 31f in the vehicle width direction.

Figure 9:
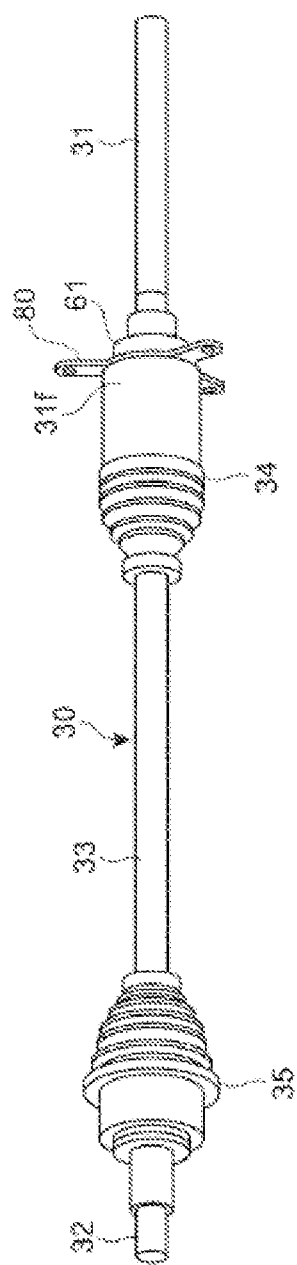
FIG. 9 is a perspective view of a drive shaft that is mounted on the oil pan.
Figure 10:
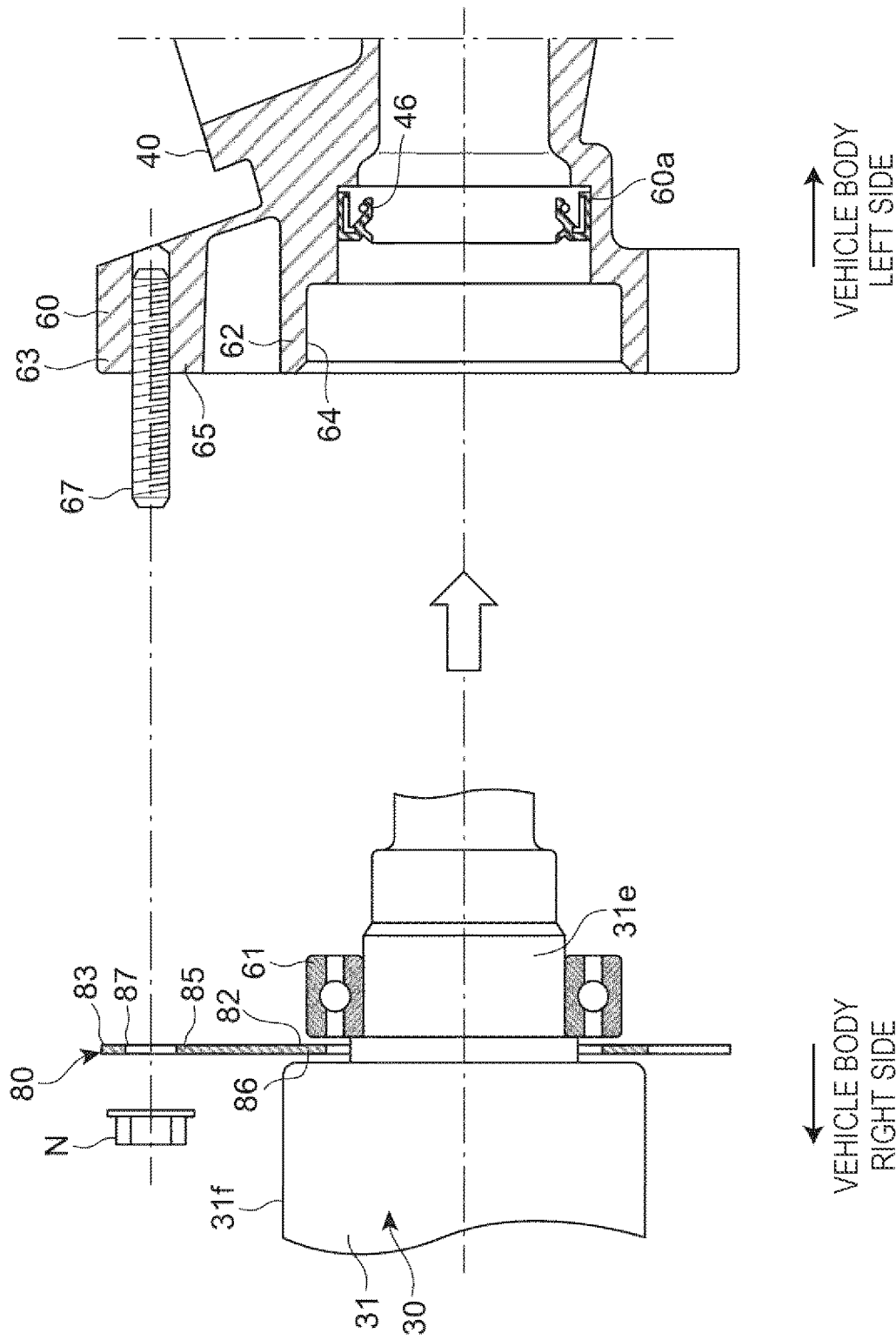
FIG. 10 is an explanatory view for explaining mounting of the drive shaft on the oil pan.

FIG. 9 is a perspective view of the drive shaft that is mounted on the oil pan, and FIG. 10 is an explanatory view for explaining mounting of the drive shaft on the oil pan. As illustrated in FIG. 9, during vehicle body assembly, the drive shaft 30 is long in the wheel-side shaft 32 and is, without a wheel support and a knuckle being mounted on the wheel-side shaft 32, inserted into the oil pan 40 and connected to the differential device 8.

The retaining member 80 is first fitted to the drive shaft 30 from the tip side and then the bearing 61 is press-fitted to the first enlarged diameter portion 31e, and the retaining member 80 is mounted on the drive shaft 30, between the second enlarged diameter portion 31f and the bearing 61.

Then, as illustrated in FIG. 10, when the drive shaft 30 is inserted into the oil pan 40 and connected to the differential device 8, the bolt insertion hole 87 of the retaining member 80 is inserted into the stud bolt 67 provided in the shaft support portion 60 in a protruding manner, and the mounting portion 85 of the retaining member 80 and the mounting portion 65 of the shaft support portion 60 contact each other and are mated. Thereafter, the nut N is screwed to the stud bolt 67 from the vehicle body right side, the retaining member 80 is mounted on the shaft support portion 60, and the drive shaft 30 is mounted and supported on the oil pan 40.

Thus, when the drive shaft 30 is moved toward the vehicle-width-direction inner side, the second enlarged diameter portion 31f engages with the regulating portion 86 of the retaining member 80 from the vehicle body right side, inhibiting the drive shaft 30 from contacting the pinion shaft 57 due to movement of the drive shaft 30 toward the vehicle body left side.

On the other hand, when the drive shaft 30 is moved toward the vehicle-width-direction outer side, the bearing 61 engages with the regulating portion 86 of the retaining member 80 from the vehicle body left side, and movement of the drive shaft 30 toward the vehicle-width-direction outer side is regulated, inhibiting the drive shaft 30 from slipping off toward the vehicle-width-direction outer side.

As described above, in the vehicle 1, the differential housing 51 is fitted to the vehicle body left side of the oil pan 40 and mounted on the oil pan 40. The differential housing 51 is, in a state of housing the drive pinion 14 and the differential device 8, mounted on the oil pan 40.

Figure 11:
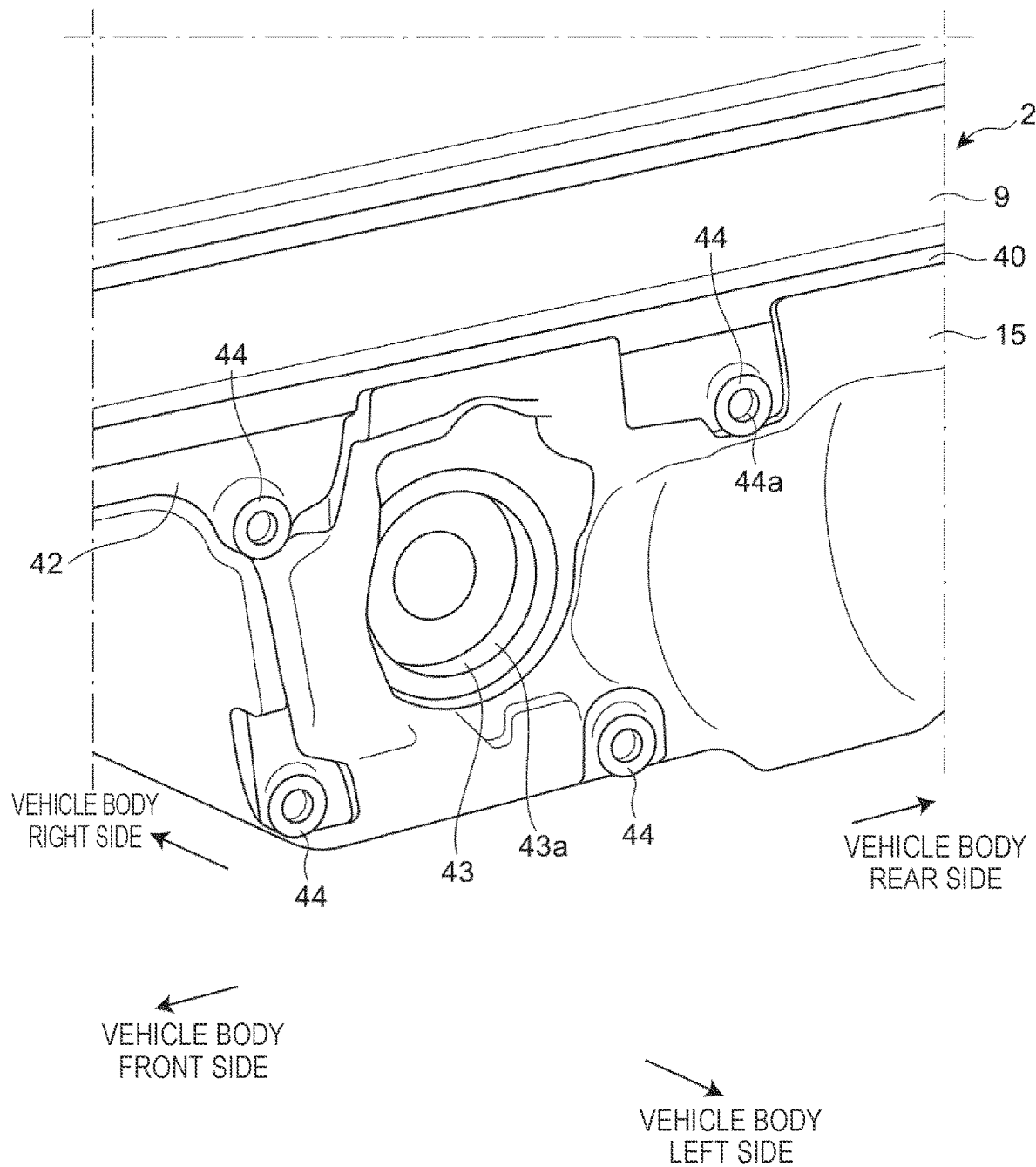
FIG. 11 is a perspective view illustrating a fitted portion of the oil pan.
Figure 12:
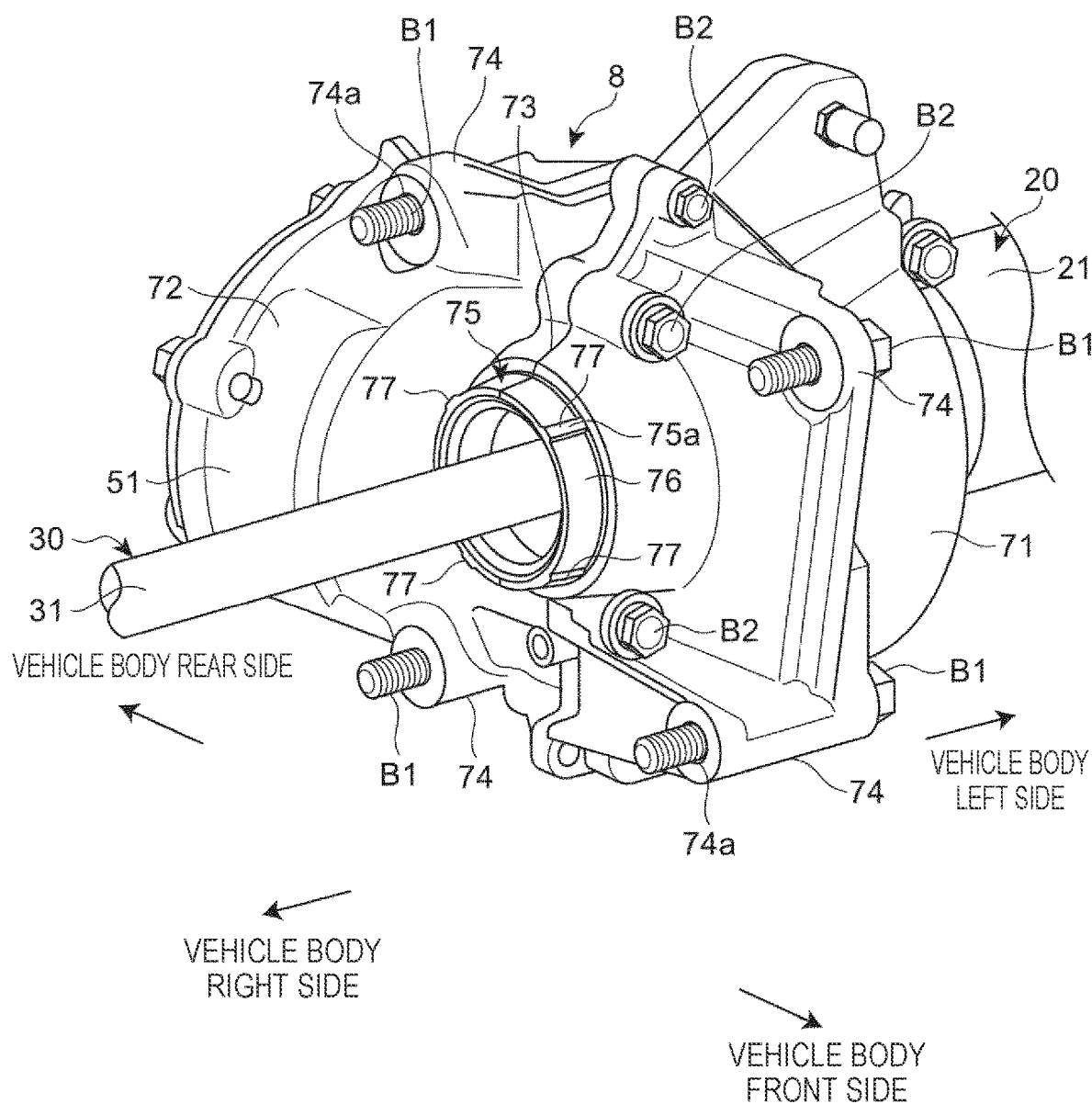
FIG. 12 is a perspective view illustrating a fitting portion of a differential housing.

FIG. 11 is a perspective view illustrating a fitted portion of the oil pan, and FIG. 12 is a perspective view illustrating a fitting portion of the differential housing. As illustrated in FIG. 11, the side face portion 42 on the vehicle body left side of the oil pan 40 is provided with a fitted portion 43 that is recessed from the vehicle body left side toward the vehicle body right side and to which the differential housing 51 is fitted. The fitted portion 43 of the oil pan 40 extends in the vehicle width direction and is formed in a cylindrical shape, and a fitting face portion of the fitted portion 43 is formed by an inner peripheral face 43a of the fitted portion 43 that is formed in a cylindrical shape.

The side face portion 42 on the vehicle body left side of the oil pan 40 is also provided with a mounting boss portion 44 as an oil pan-side mounting portion on which the differential housing 51 is mounted. The mounting boss portion 44 is formed so as to protrude toward the vehicle body right side from the side face portion 42. The oil pan 40 is provided with four mounting boss portions 44 around the fitted portion 43. A screw hole 44a is formed in each of the mounting boss portions 44, and the differential housing 51 is mounted by using a fastening bolt B1 as a fastening member.

As illustrated in FIG. 12, the differential housing 51 includes a front-side housing 71 that forms the vehicle body front side of the differential housing 51 and that houses the vehicle body front side of the differential device 8, and a rear-side housing 72 that forms the vehicle body rear side of the differential housing 51 and that houses the vehicle body rear side of the differential device 8 and the drive pinion 14.

An end face on the vehicle body rear side of the front-side housing 71 and an end face on the vehicle body front side of the rear-side housing 72 are mated in the vehicle body front-rear direction and fixed by using a fastening bolt B2, thereby forming the differential housing 51. A mating face 73 between the front-side housing 71 and the rear-side housing 72 extends in the direction orthogonal to the vehicle body front-rear direction.

The vehicle body right side of the differential housing 51 is provided with a fitting portion 75 that protrudes from the vehicle body left side toward the vehicle body right side and that fits to the fitted portion 43 of the oil pan 40. The fitting portion 75 of the differential housing 51 extends in the vehicle width direction and is formed in a cylindrical shape, and a fitting face portion of the fitting portion 75 is formed by an outer peripheral face 75a of the fitting portion 75 that is formed in a cylindrical shape. An outer diameter of the fitting face portion 75a of the differential housing 51 is formed so as to be smaller than an inner diameter of the fitting face portion 43a of the oil pan 40.

Figure 13:
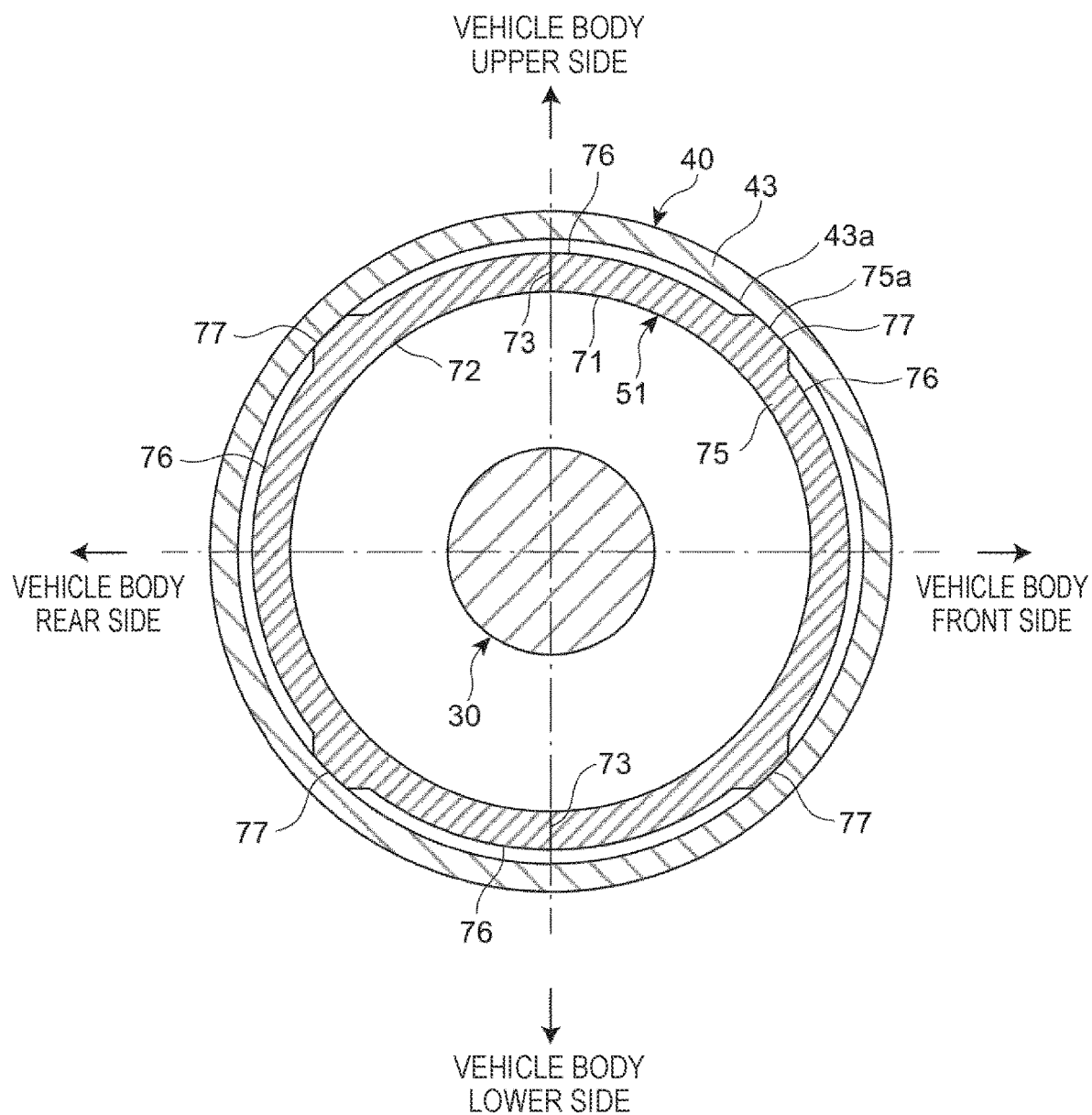
FIG. 13 is a cross-sectional view illustrating a fitting section between the oil pan and the differential housing.

FIG. 13 is a cross-sectional view illustrating a fitting section between the oil pan and the differential housing, which illustrates a cross-sectional view taken along line Y13-Y13 of FIG. 5. As illustrated in FIG. 13, in the fitting face portion 75a of the differential housing 51, a plurality of recesses 76 recessed toward the radial-direction inner side are formed, and a plurality of projections 77 protruding toward the radial-direction outer side are formed by a section excluding the plurality of recesses 76.

The fitting face portion 75a of the differential housing 51 includes, at different positions in the circumferential direction, the plurality of recesses 76 recessed in the radial direction and the plurality of projections 77 protruding in the radial direction, and is fitted to the fitting face portion 43a of the oil pan 40 such that the plurality of projections 77 contact the fitting face portion 43a of the oil pan 40.

In the vehicle 1, the fitting face portion 75a of the differential housing 51 is provided with four projections 77 on the vehicle body front upper side, the vehicle body front lower side, the vehicle body rear upper side, and the vehicle body rear lower side, which are different positions in the circumferential direction, and between the projections 77 adjacent to each other in the circumferential direction, each of four recesses 76 is formed at different positions in the circumferential direction. The four projections 77 of the fitting face portion 75a are arranged at different positions at equal intervals in the circumferential direction. The recess 76 is formed so as to have a larger circumferential-direction length than the projection 77. The plurality of projections 77 are preferably formed so as to be identical in shape with each other, and the plurality of recesses 76 are preferably formed so as to be identical in shape with each other. In the fitting face portion 75a of the differential housing 51, three or more projections 77 and three or more recesses 76 may be formed at different positions in the circumferential direction.

The differential housing 51 is formed such that the mating face 73 between the front-side housing 71 and the rear-side housing 72 is located at the recess 76 that is provided in the fitting face portion 75a of the differential housing 51. Thus, in a case where the outer peripheral face 75a of the projection 77 is processed by machining in a state where the front-side housing 71 and the rear-side housing 72 are mated, the projection 77 can be processed with high accuracy as compared with a case where the mating face 73 between the front-side housing 71 and the rear-side housing 72 is formed in the projection 77.

As illustrated in FIG. 12, the vehicle body right side of the differential housing 51 is provided with a mounting boss portion 74 as a differential housing-side mounting portion that is mounted on the oil pan 40. The mounting boss portion 74 is formed so as to protrude outward around the fitting portion 75. The differential housing 51 is provided with four mounting boss portions 74 corresponding to the mounting boss portions 44 of the oil pan 40. A bolt insertion hole 74a is formed in the mounting boss portion 74. Each of the mounting boss portions 74 and 44 of the differential housing 51 and the oil pan 40 includes a mounting face portion extending in the direction substantially orthogonal to the vehicle width direction.

In the differential housing 51, in a state where the fitting portion 75 is fitted to the fitted portion 43 of the oil pan 40 and the mounting boss portion 74 is mated to the mounting boss portion 44 of the oil pan 40, the fastening bolt B1 is screwed to the screw hole 44a of the oil pan 40 through the bolt insertion hole 74a of the differential housing 51, so that the differential housing 51 is mounted on the oil pan 40.

As described above, in the fitting portion 75 of the differential housing 51, the sealing member 47 is mounted on the vehicle body right side to prevent the lubricating oil stored in the differential housing 51 from leaking to the outside, and the sealing member 47 is arranged between the differential housing, 51, and the oil pan 40. After the differential housing 51 is mounted on the oil pan 40, the left and right drive shafts 20 and 30 are mounted.

Although in the present embodiment, the fitting face portion 75a of the fitting portion 75 of the differential housing 51 is provided with the plurality of recesses 76 recessed in the radial direction and the plurality of projections 77 protruding in the radial direction, and the fitting face portion 75a of the differential housing 51 is fitted to the fitting face portion 43a of the fitted portion 43 of the oil pan 40 by the plurality of projections 77, it is also possible to provide, in the fitting face portion 43a of the fitted portion 43 of the oil pan 40, a plurality of recesses recessed in the radial direction and a plurality of projections protruding in the radial direction and fit the fitting face portion 75a of the differential housing 51 to the fitting face portion 43a of the fitted portion 43 of the oil pan 40 by using the plurality of projections.

Furthermore, although in the fitting section between the oil pan 40 and the differential housing 51, the outer peripheral face 75a of the fitting portion 75 of the differential housing 51 is fitted to the inner peripheral face 43a of the fitted portion 43 of the oil pan 40, it is also possible to form a fitted portion of the oil pan 40 and a fitting portion of the differential housing 51 such that an inner peripheral face of the fitting portion of the differential housing 51 is fitted to an outer peripheral face of the fitted portion of the oil pan 40.

Thus, the power unit device 10 of the vehicle according to the present embodiment includes the heat insulating member 15 that covers the outer side of the oil pan 40, and the differential housing 51 that is fitted to and mounted on the oil pan 40. The fitting portion 75 that is formed in a cylindrical shape is provided in the differential housing 51, and the fitted portion 43 to which the fitting portion 75 of the differential housing 51 is fitted is provided in the oil pan 40. The fitting face portion 75a of one of the fitting portion 75 of the differential housing 51 and the fitted portion 43 of the oil pan 40 includes, at different positions in the circumferential direction, the plurality of recesses 76 recessed in the radial direction and the plurality of projections 77 protruding in the radial direction, and is fitted to the fitting face portion 43a of the other of the fitting portion 75 of the differential housing 51 and the fitted portion 43 of the oil pan 40 by the plurality of projections 77.

Thus, the outer side of the oil pan 40 is covered with the heat insulating member 15, so that warming-up of the engine 2 can be facilitated. Furthermore, the fitting face portion 75a of one of the fitting portion 75 of the differential housing 51 and the fitted portion 43 of the oil pan 40 includes the plurality of recesses 76 recessed in the radial direction and the plurality of projections 77 protruding in the radial direction, and is fitted to the fitting face portion 43a of the other of the fitting portion 75 of the differential housing 51 and the fitted portion 43 of the oil pan 40 by the plurality of projections 77. Thus, as compared with a case where the recess 76 is not formed in the fitting face portion 75a of one of the differential housing 51 and the oil pan 40, a contact area between the fitting portion 75 of the differential housing 51 and the fitted portion 43 of the oil pan 40 is reduced, and heat convection from the oil pan 40 to the differential housing 51 in the fitting section between the oil pan 40 and the differential housing 51 can be inhibited.

Accordingly, in the power unit device 10 of the vehicle 1 in which the differential device 8 is arranged on the first vehicle-width-direction side of the engine 2, warming-up of the engine 2 can be facilitated while heat convection from the oil pan 40 to the differential housing 51 in the fitting section between the oil pan 40 and the differential housing 51 is inhibited.

Furthermore, the heat insulating member 15 is arranged between the oil pan 40 and the differential housing 51.

Thus, even in a case where the differential housing 51 is fitted to and mounted on the first vehicle-width-direction side of the oil pan 40, in a section excluding the fitting section between the oil pan 40 and the differential housing 51, the heat insulating member 15 is arranged between the oil pan 40 and the differential housing 51, so that facilitation of warming-up of the engine 2 can be achieved.

Furthermore, a fitting face portion of the differential housing 51 is formed by the outer peripheral face 75a of the fitting portion 75 of the differential housing 51, a fitting face portion of the oil pan 40 is formed by the inner peripheral face 43a of the fitted portion 43 of the oil pan 40, and the outer diameter of the fitting face portion 75a of the differential housing 51 is formed so as to be smaller than the inner diameter of the fitting face portion 43a of the oil pan 40.

Since the outer diameter of the fitting face portion 75a that is formed by the outer peripheral face 75a of the fitting portion 75 of the differential housing 51 is formed so as to be smaller than the inner diameter of the fitting face portion 43a that is formed by the inner peripheral face 43a of the fitted portion 43 of the oil pan 40, the fitting portion 75 of the differential housing 51 can be relatively easily fitted and connected to the fitted portion 43 of the oil pan 40.

Furthermore, the differential housing 51 is formed by mating, in the vehicle body front-rear direction, the front-side housing 71 and the rear-side housing 72, and is formed such that the mating face 73 between the front-side housing 71 and the rear-side housing 72 is located at the recess 76 that is provided in the fitting face portion 75a of the differential housing 51.

Since the differential housing 51 is formed such that the mating face 73 between the front-side housing 71 and the rear-side housing 72 is located at the recess 76 that is provided in the fitting face portion 75a of the differential housing 51, in a case where an outer peripheral face of the projection 77 is processed by machining in a state where the front-side housing 71 and the rear-side housing 72 are mated, the projection 77 can be processed with high accuracy as compared with a case where a mating face between the front-side housing 71 and the rear-side housing 72 is formed in the projection 77.

Figure 14:
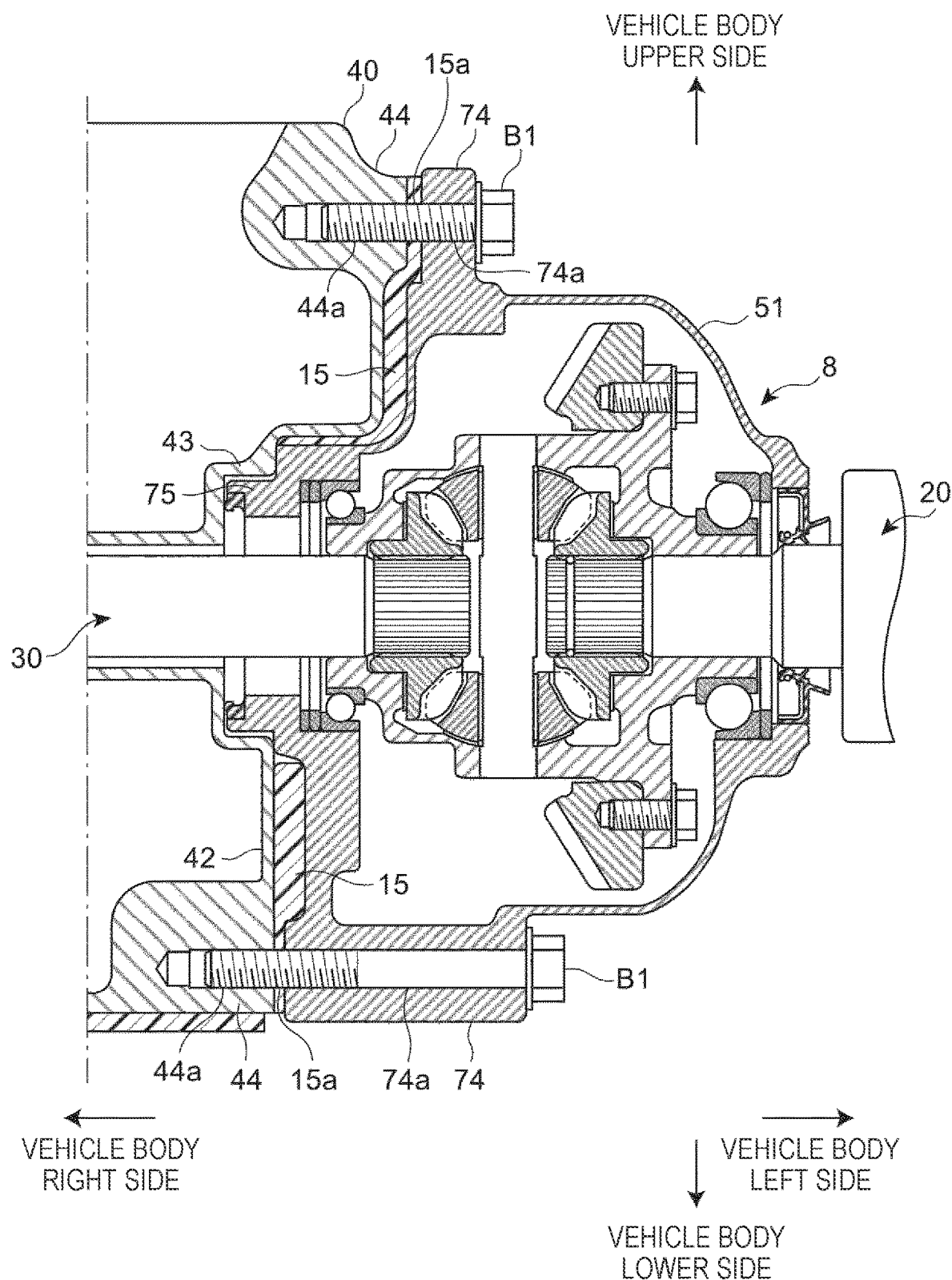
FIG. 14 is a cross-sectional view illustrating a modification of the power unit device of the vehicle.

FIG. 14 is a cross-sectional view illustrating a modification of the power unit device of the vehicle. In FIG. 14, the modification of the power unit device is illustrated by the cross-sectional view corresponding to the cross-sectional view of the power unit device 10 illustrated in FIG. 5. As illustrated in FIG. 14, it is also possible to arrange the heat insulating member 15 between the mounting boss portion 74 of the differential housing 51 and the mounting boss portion 44 of the oil pan 40 which are mounted by using the fastening bolt B1.

It is also possible to mount, on the mounting boss portion 44 of the oil pan 40, the heat insulating member 15 in which a bolt insertion hole 15a is formed and screw the fastening bolt B1 to the screw hole 44a of the oil pan 40 through the bolt insertion hole 74a of the differential housing 51 and the bolt insertion hole 15a of the heat insulating member 15 to thereby arrange the heat insulating member 15 between the mounting boss portion 74 and the mounting boss portion 44 and mount the differential housing 51 on the oil pan 40.

Thus, it is also possible to dispose the heat insulating member 15 between the differential housing-side mounting portion 74 and the oil pan-side mounting portion 44. In such a case, the heat insulating member 15 is arranged between the differential housing-side mounting portion 74 and the oil pan-side mounting portion 44 which are mounted by using the fastening member B1, so that heat convection from the oil pan 40 to the differential housing 51 can be inhibited in a mounting section between the oil pan 40 and the differential housing 51, and warming-up of the engine 2 can be facilitated.

The present invention is not limited to the exemplified embodiment, and various improvements and design changes are possible without departing from the gist of the present invention.

INDUSTRIAL APPLICABILITY

As described above, according to the present invention, in a vehicle in which a differential device is arranged on a first vehicle-width-direction side of an engine, it is possible to facilitate warming-up of the engine while inhibiting heat convection from an oil pan to a differential housing, which may be preferably used in a technical field of manufacturing a vehicle of this type or a vehicle with which this is equipped.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTERS LIST 1 vehicle
2 engine
8 differential device
10 power unit device
15 heat insulating member
20, 30 drive shaft
40 oil pan
43 fitted portion
51 differential housing
71 front-side housing
72 rear-side housing
73 mating face
75 fitting portion
76 recess
77 projection
B1 fastening member

The invention claimed is:

1. A power unit device of a vehicle in which, from a differential device that is arranged on a first vehicle-width-direction side of an engine, a drive shaft is inserted into an oil pan of the engine and extends toward a second vehicle-width-direction side, the power unit device comprising:
   a heat insulating member that covers an outer side of the oil pan; and
   a differential housing that houses the differential device and that is fitted to and mounted on the first vehicle-width-direction side of the oil pan, wherein
   a fitting portion that is formed in a cylindrical shape is provided in the differential housing,
   a fitted portion that is formed in a cylindrical shape and to which the fitting portion of the differential housing is fitted is provided in the oil pan, and
   a fitting face portion of one of the fitting portion of the differential housing and the fitted portion of the oil pan comprises, at different positions in a circumferential direction, a plurality of recesses recessed in a radial direction and a plurality of projections protruding in the radial direction, and is fitted to a fitting face portion of the other of the fitting portion of the differential housing and the fitted portion of the oil pan by the plurality of projections.

2. The power unit device of the vehicle according to claim 1, wherein the heat insulating member is arranged between the oil pan and the differential housing.

3. The power unit device of the vehicle according to claim 2, wherein
   the fitting face portion of the differential housing is formed by an outer peripheral face of the fitting portion of the differential housing,
   the fitting face portion of the oil pan is formed by an inner peripheral face of the fitted portion of the oil pan, and
   an outer diameter of the fitting face portion of the differential housing is formed so as to be smaller than an inner diameter of the fitting face portion of the oil pan.

4. The power unit device of the vehicle according to claim 3, wherein the differential housing is formed by mating, in a vehicle body front-rear direction, a front-side housing forming a vehicle body front side of the differential housing, and a rear-side housing forming a vehicle body rear side of the differential housing, and is formed such that a mating face between the front-side housing and the rear-side housing is located at the recess that is provided in the fitting face portion of the differential housing.

5. The power unit device of the vehicle according to claim 4, wherein
   the differential housing comprises a differential housing-side mounting portion that is mounted on the oil pan by using a fastening member,
   the oil pan comprises an oil pan-side mounting portion on which the differential housing is mounted by using the fastening member, and
   the heat insulating member is arranged between the differential housing-side mounting portion and the oil pan-side mounting portion.

6. The power unit device of the vehicle according to claim 1, wherein
   the fitting face portion of the differential housing is formed by an outer peripheral face of the fitting portion of the differential housing,
   the fitting face portion of the oil pan is formed by an inner peripheral face of the fitted portion of the oil pan, and
   an outer diameter of the fitting face portion of the differential housing is formed so as to be smaller than an inner diameter of the fitting face portion of the oil pan.

7. The power unit device of the vehicle according to claim 1, wherein
   the differential housing is formed by mating, in a vehicle body front-rear direction, a front-side housing forming a vehicle body front side of the differential housing, and a rear-side housing forming a vehicle body rear side of the differential housing, and is formed such that a mating face between the front-side housing and the rear-side housing is located at the recess that is provided in the fitting face portion of the differential housing.

8. The power unit device of the vehicle according to claim 1, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

9. The power unit device of the vehicle according to claim 2, wherein
the differential housing is formed by mating, in a vehicle body front-rear direction, a front-side housing forming a vehicle body front side of the differential housing, and a rear-side housing forming a vehicle body rear side of the differential housing, and is formed such that a mating face between the front-side housing and the rear-side housing is located at the recess that is provided in the fitting face portion of the differential housing.

10. The power unit device of the vehicle according to claim 2, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

11. The power unit device of the vehicle according to claim 3, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

12. The power unit device of the vehicle according to claim 6, wherein
the differential housing is formed by mating, in a vehicle body front-rear direction, a front-side housing forming a vehicle body front side of the differential housing, and a rear-side housing forming a vehicle body rear side of the differential housing, and is formed such that a mating face between the front-side housing and the rear-side housing is located at the recess that is provided in the fitting face portion of the differential housing.

13. The power unit device of the vehicle according to claim 6, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

14. The power unit device of the vehicle according to claim 7, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

15. The power unit device of the vehicle according to claim 9, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

16. The power unit device of the vehicle according to claim 12, wherein
the differential housing comprises a differential housing-side mounting portion that is mounted on the oil pan by using a fastening member,
the oil pan comprises an oil pan-side mounting portion on which the differential housing is mounted by using the fastening member, and
the heat insulating member is arranged between the differential housing-side mounting portion and the oil pan-side mounting portion.

17. The power unit device of the vehicle according to claim 1, wherein
the plurality of projections of the fitting face portion are arranged at different positions at equal intervals in the circumferential direction, and
the plurality of recesses are formed at different positions in the circumferential direction and between the projections adjacent to each other in the circumferential direction.

18. The power unit device of the vehicle according to claim 1, wherein the plurality of projections are formed so as to be identical in shape with each other, and the plurality of recesses are formed so as to be identical in shape with each other.

* * * * *